Patented Feb. 14, 1950

2,497,526

UNITED STATES PATENT OFFICE 2,497,526

PROCESS OF TREATING A POLYMERIC NITRILE WITH HYDRAZINE

Harold W. Arnold, Claymont, Del., assignor to E. I. du Pont de Nemours & Company, Wilmington, Del., a corporation of Delaware No Drawing. Application February 26, 1948, Serial No. 11,320

7 Claims. (Cl. 8—55)

This invention relates to modified polymers and to methods for their preparation.

Polyacrylonitriles possess many properties which make them attractive for fiber uses, particularly for use in textiles. A shortcoming, however, is poor dye receptivity. Efforts to overcome this deficiency have resulted in serious sacrifices in tensile strength which have rendered the fibers unusable for textile applications.

This invention has as an object a method for increasing the dye receptivity of polymeric nitriles which does not involve any sensible sacrifice in properties of the fibers or in their utility in textile applications. Other objects will appear hereinafter.

In accordance with the invention described herein, the dye receptivity of polymeric nitriles derived from unsaturated mononitriles of the general formula $H_2C=CRCN$, wherein R is hydrogen or a monovalent hydrocarbon radical, is improved by treatment of the polymer either in the form of a solid or in solution at moderate or elevated temperature with a hydrazine. The treatment is effected by contacting the polymer at a temperature of from 20° C. to 180° C. with hydrazine in amount which may vary from 1% to 60% by weight of the polymer and which for most convenient operation will depend upon whether the polymer is treated while in solution or in solid form, e. g., as yarn or filament. The treatment is continued until the dye receptivity of the polymer is substantially increased. The optimum time will depend upon the concentration of the hydrazine solution and upon the particular temperature selected which may be as little as one second at 180° C. and as long as 24 hours at 20° C. The process is most advantageously conducted, and the most satisfactory modifications of the properties of the polymer obtained, when the treatment is carried out at temperatures of from 90° C. to 100° C. for periods of time ranging from 2 to 90 minutes.

Examples of polymers of the kind used in the practice of this invention include polyacrylonitrile, polymethacrylonitrile, polyethacrylonitrile, polybutacrylonitrile, poly-alpha-phenyl-acrylonitrile, and the like. The preferred polymeric nitriles are those obtained from mononitriles of the general formula $H_2C=CRCN$, wherein the hydrocarbon radical R contains from 1 to 7 carbon atoms, and particularly when this radical is a short chain alkyl group, e. g., an alkyl group having a chain of from 1 to 4 carbon atoms. The most valuable polymer is polyacrylonitrile since it has a high softening temperature, high degree of insensitivity to organic solvents, high tensile strength and ready response to modification with the hydrazine to yield products having improved dye receptivity.

The invention is further illustrated by the following examples.

Example I

A 0.5 g. skein of a polyacrylonitrile having a denier of 109, a tenacity of 4.47 g. per denier at 21.3% elongation and a loop strength of 3.38 g. per denier at 17.6% elongation was suspended in hydrazine for 30 minutes at 95° C. At the end of this time the skein was removed from the hydrazine, washed thoroughly with hot water, dried and then suspended in 200 ml. of a 2.5% water solution of an acid dyestuff acidified with 1 cc. of 0.1% acetic acid, and heated for one hour at the boiling point of the solution. The dyed skein was then rinsed in hot 5% soap solution, followed by rinsing in hot water, and dried. The skein thus treated took up 0.6% of the dye (based on the weight of the yarn), as compared with no take-up for the untreated polyacrylonitrile fiber. The dyed, modified skein had a denier of 107, a tenacity of 3.73 g. per denier at 26.2% elongation, and a loop strength of 3.18 g. per denier at 21.7% elongation.

Duplication of the above experiment with an acid dyestuff such as sodium p-sulfo-o-toluene-azo-beta-naphthol gave similar results.

Example II

The polyacrylonitrile described in Example I was dissolved in dimethylformamide to yield an 11% solution by weight. To 10 cc. of this solution there was added, under a blanket of nitrogen, one cc. of hydrazine and the mixture heated at 95° to 100° C. for one hour. The solution was cast on a plate and the resulting film baked for 20 minutes at 100° C. Sections of the film were dyed with the sodium salt of p-sulfo-o-toluene-azo-beta-naphthol. The film showed good dye take-up.

Example III

Five grams of the polyacrylonitrile of Example I was suspended in 20 cc. of hydrazine and the mixture heated at 90° to 100° C. for 4 minutes. The hydrazine was removed from the polymer by filtration. The treated polymer was washed with absolute alcohol, dried, and then dissolved in dimethylformamide to make a 10% solution. Films cast from this solution and dyed with the sodium salt of p-sulfo-o-toluene-azo-beta-naphthol by the procedure described in Example I showed improved dye take-up, as compared with the untreated polyacrylonitrile.

Example IV

A 0.5 g. skein of the polyacrylonitrile of Example I was suspended in hydrazine hydrochloride for one hour at 95° to 100° C., the fiber withdrawn from the hydrazine hydrochloride rinsed with water and dried. The treated skein was dyed with an acid dyestuff according to the procedure of Example I and it showed a dye take-up equivalent to 0.01 to 0.05% based on the weight of the fiber.

Example V

Several unoriented films of polyacrylonitrile cast from solution in dimethyl formamide by heating at 100° C. until all the solvent had been removed were heated for 5 minutes in 85% hydrazine hydrate at 120° C. Upon removal from the treating bath the films were washed several times in distilled water and air-dried. The treated films were dyed with an acid dyestuff by the procedure of Example I. A very pronounced improvement in dye-receptivity was noted as compared to the untreated control.

Example VI

A skein of oriented and hot-relaxed polyacrylonitrile yarn was heated for 4 minutes at 100° C. in 75% hydrazine hydrate. The treated skein was thereafter washed thoroughly with water and air-dried. The treated skein was dyed by the procedure of Example I with an acid dyestuff. A marked improvement in dye-receptivity was noted in the treated skein as compared to the untreated control. The treated skein showed no dye run-off when washed with soapy water.

In carrying out the present process the hydrazine can be used as such or as its salts with inorganic acids, e. g., the hydrochloride, sulfate or nitrate, or as the monosubstituted and symmetrical and unsymmetrical disubstituted hydrazines, e. g., N,N-dimethylhydrazine, N,N'-dimethylhydrazine, N-phenylhydrazine, N-methyl-N'-phenylhydrazine, and the like.

Although in Example I a dye liquor to fiber ratio of 400:1 has been used, it is to be understood that shorter ratios such as for example 40:1 may be used, if desired.

The concentration of the acid in the dye bath, based on the weight of fiber, may be varied within wide limits. Thus as much as 5% can be used to obtain special effects.

The examples illustrate improved dye receptivity with a specific acid dyestuff. Similar improved affinity is obtained toward other acid dyestuffs, e. g., neutral dyeing colors, sour dyeing colors, anthraquinone dyes, premetalized azo dyes, etc., and also toward chrome colors, acetate dyes, and direct dyestuffs.

The process of this invention is simple and economical and through its use the markedly improved dye receptivity of polyacrylonitrile fibers is obtained without sacrifice in essential fiber properties, such as tensile strength. Fibers composed of polymeric nitriles treated in accord with the process described herein can be dyed directly with acid dyestuffs.

As many apparently widely different embodiments of this invention may be made without departing from the scope and spirit thereof, it is to be understood that this invention is not limited to the specific embodiments thereof except as defined in the appended claims.

I claim:

1. A process which comprises contacting a polymeric nitrile with hydrazine at a temperature of from 20° to 180° C. until the dye receptivity of said polymeric nitrile is substantially increased, said polymeric nitrile being the polymer of an unsaturated mononitrile of the formula $H_2C=CRCN$ wherein R is selected from the group consisting of hydrogen and monovalent hydrocarbon radicals.

2. The process set forth in claim 1 in which R in said formula is a hydrocarbon radical containing from 1 to 7 carbon atoms.

3. The process set forth in claim 1 in which R in said formula is an alkyl group having a chain of from 1 to 4 carbon atoms.

4. The process set forth in claim 1 in which said polymeric nitrile is polyacrylonitrile.

5. A process which comprises contacting a polymeric nitrile in the form of a filament with hydrazine at a temperature of from 20° C. to 180° C. until the dye receptivity of said polymeric nitrile is substantially increased, said polymeric nitrile being the polymer of an unsaturated mononitrile of the formula $H_2C=CRCN$ wherein R is selected from the group consisting of hydrogen and monovalent hydrocarbon radicals.

6. A process which comprises contacting a solution of a polymeric nitrile with hydrazine at a temperature of from 20° C. to 180° C. until the dye receptivity of said polymeric nitrile is substantially increased, said polymeric nitrile being the polymer of an unsaturated mononitrile of the formula $H_2C=CRCN$ wherein R is selected from the group consisting of hydrogen and monovalent hydrocarbon radicals.

7. A hydrazine-modified acrylonitrile polymer which is the reaction product obtained by reacting polymeric acrylonitrile with hydrazine until the dye receptivity of the polymeric acrylonitrile is substantially increased.

HAROLD W. ARNOLD.

REFERENCES CITED

The following references are of record in the file of this patent:

UNITED STATES PATENTS

| Number | Name | Date |
|---|---|---|
| 2,436,926 | Jacobson | Mar. 2, 1948 |